US009438397B2

(12) United States Patent
Malladi et al.

(10) Patent No.: US 9,438,397 B2
(45) Date of Patent: *Sep. 6, 2016

(54) PSEUDO-RANDOM SEQUENCE MAPPING IN WIRELESS COMMUNICATIONS

(71) Applicant: QUALCOMM Incorporated, San Diego, CA (US)

(72) Inventors: Durga Prasad Malladi, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,852

(22) Filed: Mar. 2, 2015

(65) Prior Publication Data

US 2015/0172020 A1    Jun. 18, 2015

Related U.S. Application Data

(63) Continuation of application No. 12/133,164, filed on Jun. 4, 2008, now Pat. No. 8,971,305.

(60) Provisional application No. 60/942,201, filed on Jun. 5, 2007, provisional application No. 60/945,073, filed on Jun. 19, 2007.

(51) Int. Cl.
*H04L 5/00*    (2006.01)
*H04W 72/04*    (2009.01)
*H04J 11/00*    (2006.01)
(Continued)

(52) U.S. Cl.
CPC .......... *H04L 5/0048* (2013.01); *H04J 11/0069* (2013.01); *H04L 5/0007* (2013.01); *H04L 25/03866* (2013.01); *H04L 27/2607* (2013.01); *H04W 56/001* (2013.01); *H04W 72/042* (2013.01); *H04L 27/2613* (2013.01)

(58) Field of Classification Search
None
See application file for complete search history.

(56) References Cited

U.S. PATENT DOCUMENTS

| 4,817,142 A | 3/1989 | Van Rassel |
| 5,282,249 A | 1/1994 | Cohen et al. |

(Continued)

FOREIGN PATENT DOCUMENTS

| JP | 2006253987 A | 9/2006 |
| JP | 2006319765 A | 11/2006 |

(Continued)

OTHER PUBLICATIONS

Anonymous : "Cell Search Scheme for Evolved UTRA" 3GPP TSG-RAN WG1 Meeting Ad Hoc LTE, XX, XX, Jan. 23, 2006, pp. 1-4, XP002447272 the whole document.

(Continued)

*Primary Examiner* — Dung B Huynh
(74) *Attorney, Agent, or Firm* — Liem T. Do

(57) ABSTRACT

Systems and methodologies are described that facilitate scrambling of downlink reference signals utilizing a pseudo-random sequence (PRS) corresponding to a primary synchronization code (PSC) and secondary synchronization code (SSC) combination. In an aspect, a method includes receiving a scrambled downlink reference signal, determining a pseudo-random sequence based on received PSC and SSC, and descrambling a portion of subframes of the downlink reference signal according to the pseudo-random sequence and a determined cyclic prefix length for one or more of the portion of subframes.

29 Claims, 11 Drawing Sheets

(51) Int. Cl.
*H04L 25/03* (2006.01)
*H04W 56/00* (2009.01)
*H04L 27/26* (2006.01)

(56) References Cited

U.S. PATENT DOCUMENTS

| | | | |
|---|---|---|---|
| 6,185,265 B1 | 2/2001 | Campanella | |
| 6,373,858 B1 | 4/2002 | Soleimani et al. | |
| 6,584,200 B1 | 6/2003 | Tanaka | |
| 6,741,578 B1 | 5/2004 | Moon et al. | |
| 6,822,999 B1 | 11/2004 | Lee et al. | |
| 6,831,929 B1 | 12/2004 | Sriram et al. | |
| 7,269,403 B1 | 9/2007 | Miao | |
| 7,593,367 B2 | 9/2009 | Amerga et al. | |
| 7,738,437 B2 | 6/2010 | Ma et al. | |
| 7,965,759 B2 | 6/2011 | Luo et al. | |
| 8,971,305 B2* | 3/2015 | Malladi et al. | 370/342 |
| 2002/0075833 A1* | 6/2002 | Dick et al. | 370/336 |
| 2002/0090024 A1* | 7/2002 | Tan | 375/146 |
| 2002/0106004 A1 | 8/2002 | Tan | |
| 2002/0163907 A1 | 11/2002 | Odenwalder et al. | |
| 2003/0091022 A1 | 5/2003 | Blanz et al. | |
| 2003/0095516 A1 | 5/2003 | Ok et al. | |
| 2003/0095531 A1 | 5/2003 | Soerensen et al. | |
| 2004/0037422 A1 | 2/2004 | Bodo et al. | |
| 2004/0223472 A1* | 11/2004 | Sankaran et al. | 370/335 |
| 2005/0018646 A1 | 1/2005 | Sriram et al. | |
| 2005/0084112 A1 | 4/2005 | Kim et al. | |
| 2005/0128934 A1* | 6/2005 | Gu et al. | 370/206 |
| 2005/0232217 A1 | 10/2005 | Do et al. | |
| 2005/0238087 A1 | 10/2005 | Yang et al. | |
| 2005/0271026 A1 | 12/2005 | Song et al. | |
| 2006/0045169 A1 | 3/2006 | Kim | |
| 2006/0050626 A1 | 3/2006 | Yucek et al. | |
| 2006/0233139 A1 | 10/2006 | Kuo | |
| 2007/0071137 A1 | 3/2007 | McCorkle | |
| 2007/0091785 A1 | 4/2007 | Lindoff et al. | |
| 2007/0133390 A1 | 6/2007 | Luo et al. | |
| 2007/0298780 A1 | 12/2007 | Lindoff et al. | |
| 2008/0043613 A1 | 2/2008 | Yang et al. | |
| 2008/0062857 A1 | 3/2008 | Monogioudis et al. | |
| 2008/0101414 A1* | 5/2008 | Zhang | 370/476 |
| 2008/0101511 A1* | 5/2008 | Lindoff et al. | 375/347 |
| 2008/0102896 A1* | 5/2008 | Wang et al. | 455/560 |
| 2008/0107086 A1 | 5/2008 | Fukuta et al. | |
| 2008/0165675 A1* | 7/2008 | Yang et al. | 370/210 |
| 2008/0285433 A1* | 11/2008 | Akita et al. | 370/204 |
| 2008/0285529 A1 | 11/2008 | Kwak et al. | |
| 2009/0041240 A1 | 2/2009 | Parkvall et al. | |
| 2009/0252109 A1 | 10/2009 | Kim et al. | |
| 2010/0014660 A1 | 1/2010 | Kishiyama et al. | |
| 2013/0165052 A1 | 6/2013 | Chuang | |

FOREIGN PATENT DOCUMENTS

| | | |
|---|---|---|
| KR | 20070046200 | 5/2007 |
| WO | WO-2006026429 A1 | 3/2006 |
| WO | WO-2006080904 A1 | 8/2006 |
| WO | WO-2007051157 | 5/2007 |

OTHER PUBLICATIONS

Anonymous: "Cell search and related physical channel mapping" 3GPP TSG-RAN WG1 Meeting Ad Hoc LTE, XX, XX, No. R1-060079, Jan. 23, 2006, pp. 1-6, XP002447271 the whole document.

International Search Report—PCT/US2008/065985, International Search Authority—European Patent Office—Sep. 18, 2008.

Written Opinion—PCT/US2008/065985, International Search Authority—European Patent Office, Munich—Sep. 18, 2008.

\* cited by examiner

PSEUDO-RANDOM SEQUENCE MAPPING IN WIRELESS COMMUNICATIONS

CROSS-REFERENCE TO RELATED APPLICATIONS

The present application for patent is a continuation application of U.S. patent application Ser. No. 12/133,164, filed Jun. 4, 2008, entitled "PSEUDO-RANDOM SEQUENCE MAPPING IN WIRELESS COMMUNICATIONS," and now issued as U.S. Pat. No. 8,971,305, which claims the benefit of U.S. Provisional Patent Application Ser. No. 60/942,201 entitled "A METHOD AND APPARATUS FOR PSEUDO-RANDOM SEQUENCE (PRS) MAPPING FOR LTE" which was filed Jun. 5, 2007, and U.S. Provisional Patent Application Ser. No. 60/945,073 entitled "METHOD AND APPARATUS FOR PSEUDO-RANDOM SEQUENCE (PRS) MAPPING FOR LTE" which was filed Jun. 19, 2007, all of which are assigned to assignee hereof and hereby expressly incorporated by reference.

BACKGROUND

I. Field

The following description relates generally to wireless communications, and more particularly to pseudo-random sequence mapping for physical layer communications channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Transmissions over the multiple antennas are sometimes scrambled to allow independent communication from a number of cells over the antennas. This has previously been accomplished using a pseudo-random signal that is random across a number of cells and an orthogonal sequence (OS) of complex numbers utilized to orthogonalize the reference signals from different sectors in the same base station. However, in communications having an extended cyclic prefix (CP) (e.g., to account for far away echoes in certain environments), communications channels are expected to become more frequency selective resulting in substantial loss of orthogonality of the orthogonal sequences at the receiver.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating providing scrambling for wireless communication for a number of cells without using an orthogonal sequence (OS), or at least not for certain communication subframes based at least in part on a cyclic prefix (CP) thereof. In one example, the scrambling can be implemented by utilizing a synchronization code pair comprising a primary synchronization code (PSC), which can have varying values for reuse unlike conventional PSCs, and a secondary synchronization code (SSC), which maps to a pseudo-random signal. The PSC/SSC combination identifies the cell and directly maps to the sequence used to scramble the communications from the cell.

According to related aspects, a method for interpreting a downlink reference signal in a wireless communications network is provided. The method can comprise receiving a scrambled downlink reference signal from a transmitter and determining a pseudo-random sequence based at least in part on received primary and secondary synchronization codes. The method can also include descrambling a portion of subframes of the downlink reference signal according to the pseudo-random sequence and a determined cyclic prefix length for one or more of the portion of subframes.

Another aspect relates to a wireless communications apparatus. The wireless communications apparatus can include at least one processor configured to determine a cyclic prefix length of one or more subframes of a downlink reference signal and select a descrambling based at least in part on the cyclic prefix length. The wireless communications apparatus can also include a memory coupled to the at least one processor.

Still another aspect relates to a computer-readable medium including code for causing at least one computer to receive a scrambled downlink reference signal from a transmitter. The computer-readable medium can also comprise code for causing the at least one computer to determine a pseudo-random sequence with at least a primary and secondary synchronization code. Moreover, the computer-readable medium can comprise code for causing the at least one computer to descramble a portion of the downlink reference signal according to the pseudo-random sequence and a determined cyclic prefix length for one or more of the portion of subframes.

According to a further aspect, a method for transmitting a downlink reference signal in a wireless communications network is provided. The method includes generating a downlink reference signal comprising primary and secondary synchronization codes. The method further includes scrambling the downlink reference signal based at least in part on a pseudo-random sequence corresponding to combination of the primary and secondary synchronization codes and transmitting the scrambled downlink reference signal.

Another aspect relates to a wireless communications apparatus. The wireless communications apparatus can include at least one processor configured to obtain a pseudo-random sequence related to a chosen primary and secondary synchronization code combination and scramble a downlink reference signal using the pseudo-random sequence. The wireless communications apparatus can also include a memory coupled to the at least one processor.

Still another aspect relates to a computer-readable medium including code for causing at least one computer to generate a downlink reference signal comprising primary and secondary synchronization codes. Moreover, the computer-readable medium can comprise code for causing the at least one computer to scramble the downlink reference signal based at least in part on a pseudo-random sequence corresponding to combination of the primary and secondary synchronization codes.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
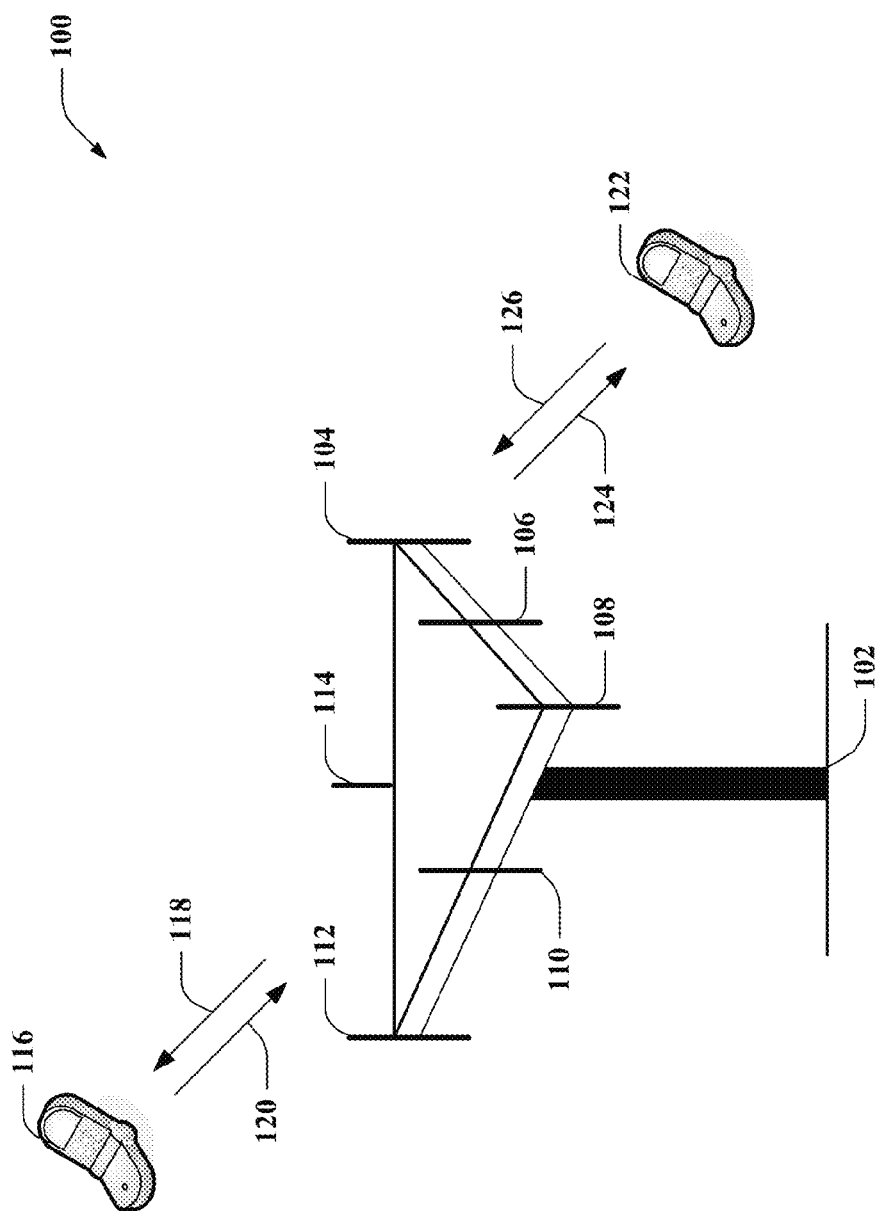
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, one or more multiplexing schemes (e.g., OFDM) can be utilized to modulate multiple signals over a number of frequency subcarriers forming one or more communications channels. In one example, a transmitter of the channels, such as base station 102 and/or mobile devices 116 and 122, can additionally transmit a pilot or reference signal to aid in synchronizing communications with another device or estimating the channels. For instance, a downlink reference signal (RS) transmitted from a sector in base station 102 can be a function of one or more synchronization codes. In an example, the RS can have a duration equal to a number of subframes (e.g., 10 subframes) and the synchronization codes can be within one or more of the subframes (subframes 0 and 5, in one example).

According to an example, the used synchronization codes can uniquely determine the pseudo-random sequence (PRS) utilized to scramble the RS. In one example, the RS is scrambled by performing an XOR operation with the PRS. As mentioned, previous systems utilized an orthogonal sequence along with the PRSs to provide a cell specific scrambling uniquely tied to the cell identity; however, transmissions having an extended cyclic prefix (CP) are expected to result in a larger channel selectivity, which begins to phase out the orthogonality of the orthogonal sequences at the receiver (e.g., mobile devices 116 and/or 122). The subject matter described herein utilizes a secondary synchronization code (SSC) that maps to a PRS along with a primary synchronization code (PSC), not only for conventional slot boundary detection, but also as a dynamic reuse factor for the PRS, to scramble the RS according to a number of PRSs. The PSC/SSC combination can also serve to identify the transmitter of the RS (e.g., a particular sector in base station 102, mobile devices 116 and 122 or a transmitting cell related thereto). Thus, rather than applying a PRS and an orthogonal sequence, just a PRS based on the PSC/SSC combination is applied. As the number of PSCs can be substantially the same as the number of orthogonal sequences previously, the subject matter as described provides substantially the same number of combinations that were available utilizing the orthogonal sequence. It is to be appreciated, however, that in subframes having normal CP (or CP below a given threshold) where orthogonal signals may provide substantial benefit, such signals can still optionally be used along with PRSs to provide the cell specific scrambling uniquely tied to the cell identity.

Figure 2:
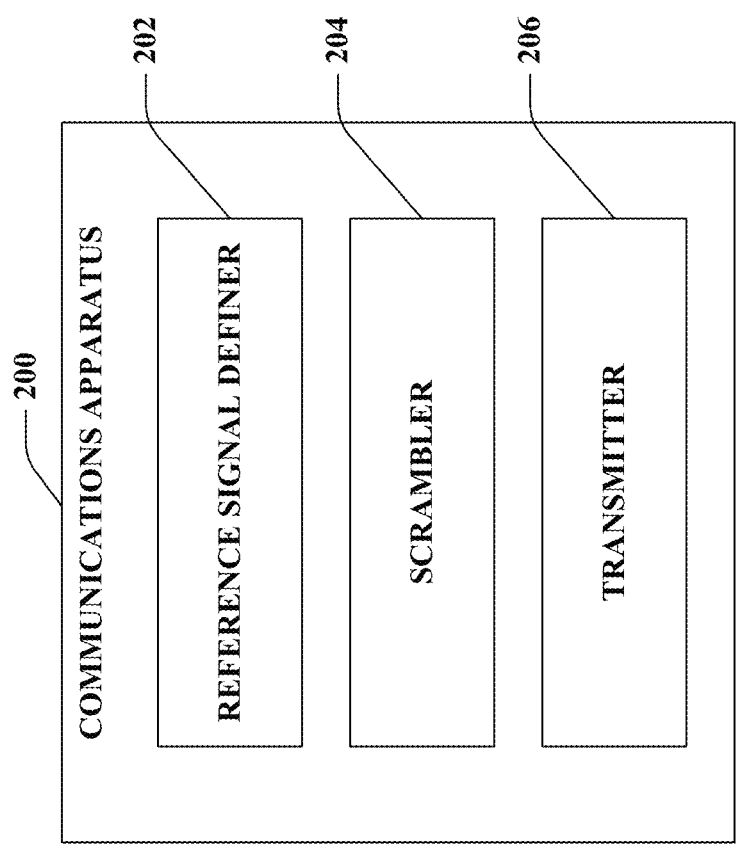
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station sector or a portion thereof, a mobile device or a portion thereof, or substantially any communications apparatus that receives data transmitted in a wireless communications environment. The communications apparatus 200 can include a reference signal definer 202 that creates an RS for broadcasting to one or more disparate communications apparatuses, a scrambler 204 that scrambles the RS according to one or more synchronizations codes, and a transmitter 206 that transmits the scrambled RS.

According to an example, the communications apparatus 200 can transmit a downlink RS that can be utilized by a receiver to determine information regarding transmissions from the communications apparatus 200. In one example, the reference signal definer 202 can create an RS that can be used to identify or synchronize with the communications apparatus 200 and/or the like. The synchronization codes can comprise a PSC and SSC related to the cell specific scrambling used for the RS transmission. The SSC can uniquely determine the corresponding PRS, and the PSC can uniquely determine the reuse factor for the PRS. Thus, the available number of PRSs can be substantially equal to the product of the available PSCs and the available SSCs.

The PSC and SSC utilized by the communications apparatus 200 can relate to a PRS used by the scrambler 204 to scramble the RS. This can also serve to identify the communications apparatus 200 with respect to surrounding transmitting apparatuses. In a 3GPP LTE example, 170 SSCs can correspond to 170 PRSs that the scrambler 204 can utilize to scramble the RS. Additionally, 3 PSCs can provide a reuse factor to render 510 PRSs that can be utilized to scramble the RS and uniquely identify the communications apparatus 200 or a cell thereof with respect to communications apparatuses receiving the RS. The scrambled RS can be transmitted to one or more such apparatuses by utilizing the transmitter 206. It is to be appreciated that the above example can mitigate utilizing orthogonal sequences in scrambling RSs where, for example, extended or longer CP subframes are utilized (e.g., where subject to far away echoes and the like).

Figure 3:
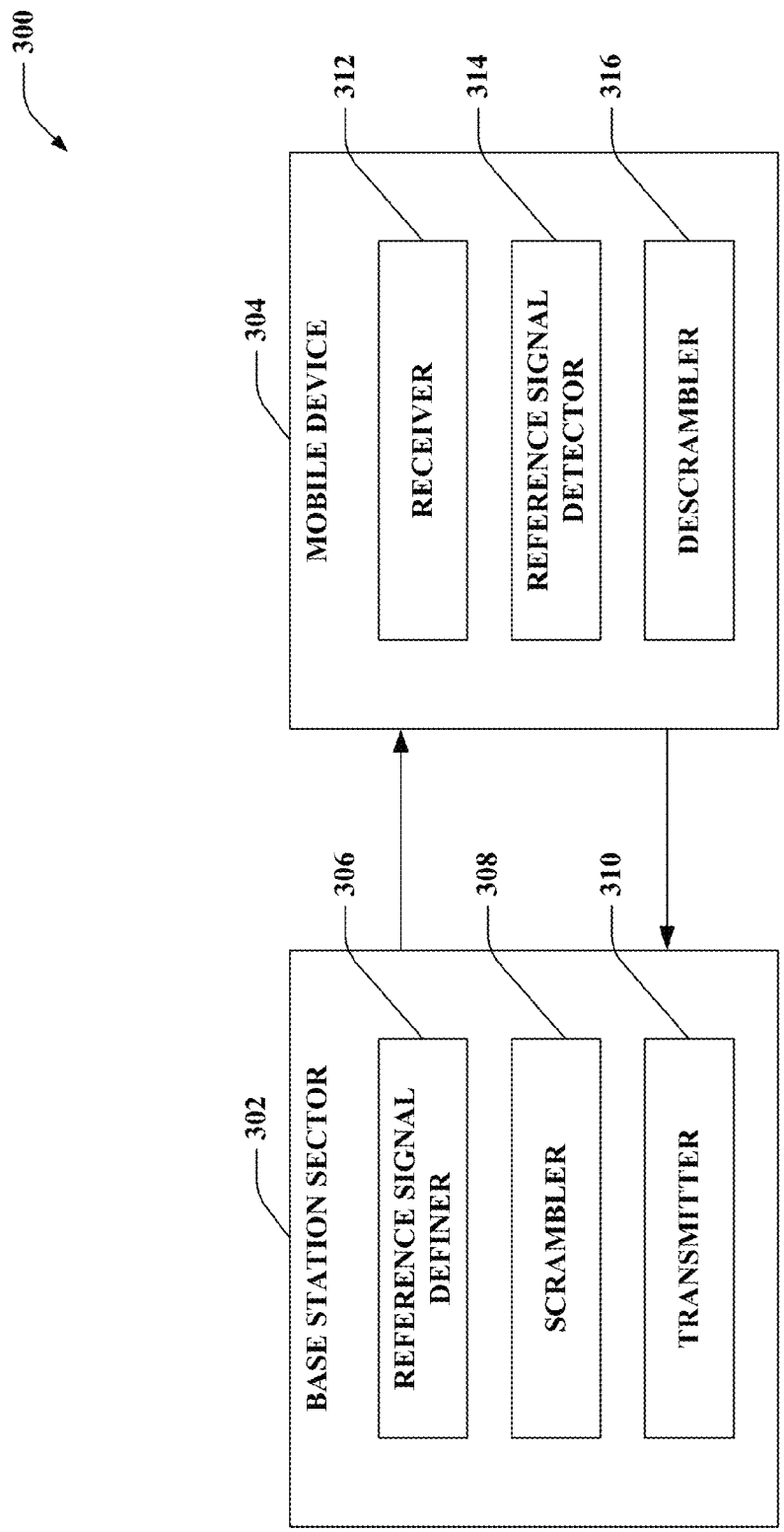
FIG. 3 is an illustration of an example wireless communications system that effectuates communicating scrambled downlink reference signals.

However, orthogonalizing the RS can be beneficial when the orthogonality can be retained, as expected when using normal CP length. Thus, where extended CPs are utilized (e.g., CPs having length exceeding a specified threshold), the above PSC/SSC combination can determine the PRS utilized by the scrambler 204 from the RS. Optionally, where the CP does not exceed the threshold or is normal length, the PRS utilized can relate to the SSC alone, and the signal can be orthogonalized according to a conventional orthogonal sequence. In a 3GPP LTE example, 170 SSCs can correspond to 170 PRSs that the scrambler 204 can utilize to scramble the RS. Additionally, 3 orthogonal sequences can be available for orthogonalizing the RS to render 510 combinations of orthogonal sequence and PRS that can be utilized to scramble the RS and uniquely identify the communications apparatus 200 or a cell thereof Now referring to FIG. 3, illustrated is a wireless communications system 300 that transmits downlink RSs scrambled with a cell indentifying code. The system 300 includes a base station sector 302 that communicates with a mobile device 304 (and/or any number of disparate mobile devices (not shown)). Base station sector 302 can transmit information to mobile device 304 over a forward link or downlink channel; further base station sector 302 can receive information from mobile device 304 over a reverse link or uplink channel. Moreover, system 300 can be a MIMO system. Also, the components and functionalities shown and described below in the base station sector 302 can be present in the mobile device 304 as well and vice versa, in one example; the configuration depicted excludes these components for ease of explanation.

Base station sector 302 includes a reference signal definer 306 that can generate a RS for transmission to the mobile device 304 where the RS can be comprise information for interpreting signals transmitted from the base station sector 302, a scrambler 308 that can scramble the RS by utilizing a source identifying PRS, and a transmitter 310 that can transmit the scrambled RS. As described, the PRS can correspond to a SSC and/or PSC/SSC pair stored in the RS. For example, the PRS can correspond to an SSC where normal CP subframes are utilized along with an orthogonal sequence to orthogonalize the RS, and the PRS can correspond to a PSC/SSC pair where extended CP subframes are utilized as described previously.

Mobile device 304 includes a receiver 312 that can receive transmitted signals, a reference signal detector 314 that can determine signals as RSs, and a descrambler 316 that can descramble RSs according to information received therein. In one example, the receiver 312 can receive one or more reference signals, and the reference signal detector 314 can determine that the signal is an RS and extract synchronization information from one or more subframes of the RS. The descrambler 316 can descramble the reference signal to retrieve additional information according to the extracted information.

In one example, the reference signal definer 306 can create an RS as described previously, and the scrambler 308 can scramble the RS as described previously using a PRS corresponding to a PSC/SSC combination. The RS can additionally store the PSC and the SSC. Subsequently, the transmitter 310 can transmit the RS to one or more mobile devices, such as mobile device 304, to provide synchronization/identity information of the base station sector 302 for communicating therewith. The RS can be received by the receiver 312 of the mobile device 304 and detected as an RS by the reference signal detector 314. The reference signal detector 314 can detect the signal at least in part by determining a PSC and/or SSC thereof (e.g., based on subframe 0 of the RS). Upon determining the PSC/SSC combination, the reference signal detector 314 can discern a PRS utilized to scramble the RS, and the descrambler 316 can descramble the RS according to the PRS.

As described, in operation with extended CP, the conventional orthogonal sequence step in the scrambling can become detrimental. Thus, utilizing only PRS while extending the number of available PRSs to provide substantially the same number as PRS/orthogonal sequence combinations allows for similar versatility for identifying the base station sector 302 without the extra orthogonalization steps. However, as mentioned, utilizing the orthogonal sequence can provide benefit in operation with normal CP; thus, the orthogonal sequence can be utilized in such a case, while using the PSC/SSC combination in extended CP subframes in one example.

In this example, the mobile device 304 can receive the RS via the receiver 312, and the reference signal detector 314 can determine if subframe 0 of the RS was sent in an extended or normal CP subframe. If an extended CP is detected in subframe 0, the reference signal detector 314 can determine that orthogonal sequencing was not used in scrambling the RS for the given subframe. Thus, the PRS was constructed from the unique mapping from the PSC/SSC combination, and the PRS alone was used to scramble the RS. On the other hand, if a normal CP is detected in subframe 0, the reference signal detector 314 can determine that orthogonal sequencing was used in scrambling the RS for the given subframe. Thus, the PRS was constructed from the mapping to SSC alone and utilized to scramble the RS along with the orthogonal sequence. The descrambler 316 can utilize this information in descrambling the RS.

Additionally, in this example, if the reference signal detector 314 detects an extended CP in subframe 0, extended CP can be assumed for the remainder of the subframes, in one example. Therefore, the extracted PSC/SSC combination can be utilized by the descrambler 316 to descramble the remaining subframes. If, however, the reference signal detector 314 detects a normal CP in subframe 0, the physical broadcast channel (PBCH), which is typically found in subframe 0, or the dynamic broadcast channel (DBCH) can specify which subframes use extended CP and which use normal CP. Where remaining subframes use normal CP, the SSC can correlate to the PRS used to scramble the corresponding subframes, and the reference signal detector 314 can presume orthogonal sequence usage in these subframes; where remaining subframes use extended CP, the PSC/SSC combination can correlate to the PRS used to scramble the corresponding subframe, and orthogonal sequencing was not used. It is to be appreciated that where subframe 0 uses extended CP, the dynamic BCH can additionally specify subframes having normal and extended CP such that the above differentiation can be utilized with respect to the remaining subframes. Additionally, it is to be appreciated that the PSC/SSC combination can be utilized in all subframes regardless of CP length in one example.

Figure 4:
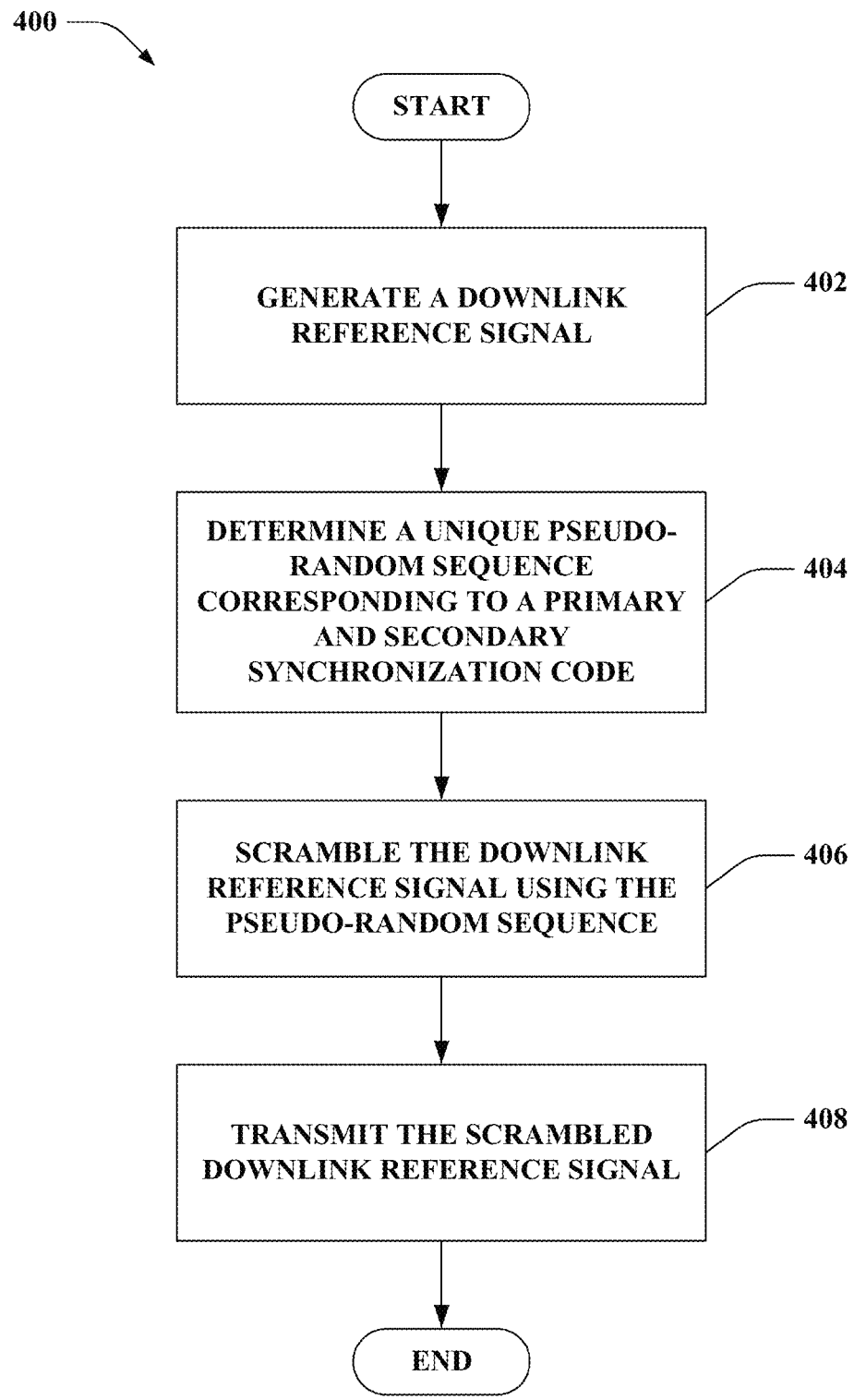
FIG. 4 is an illustration of an example methodology that facilitates transmitting scrambled downlink reference signals.
Figure 5:
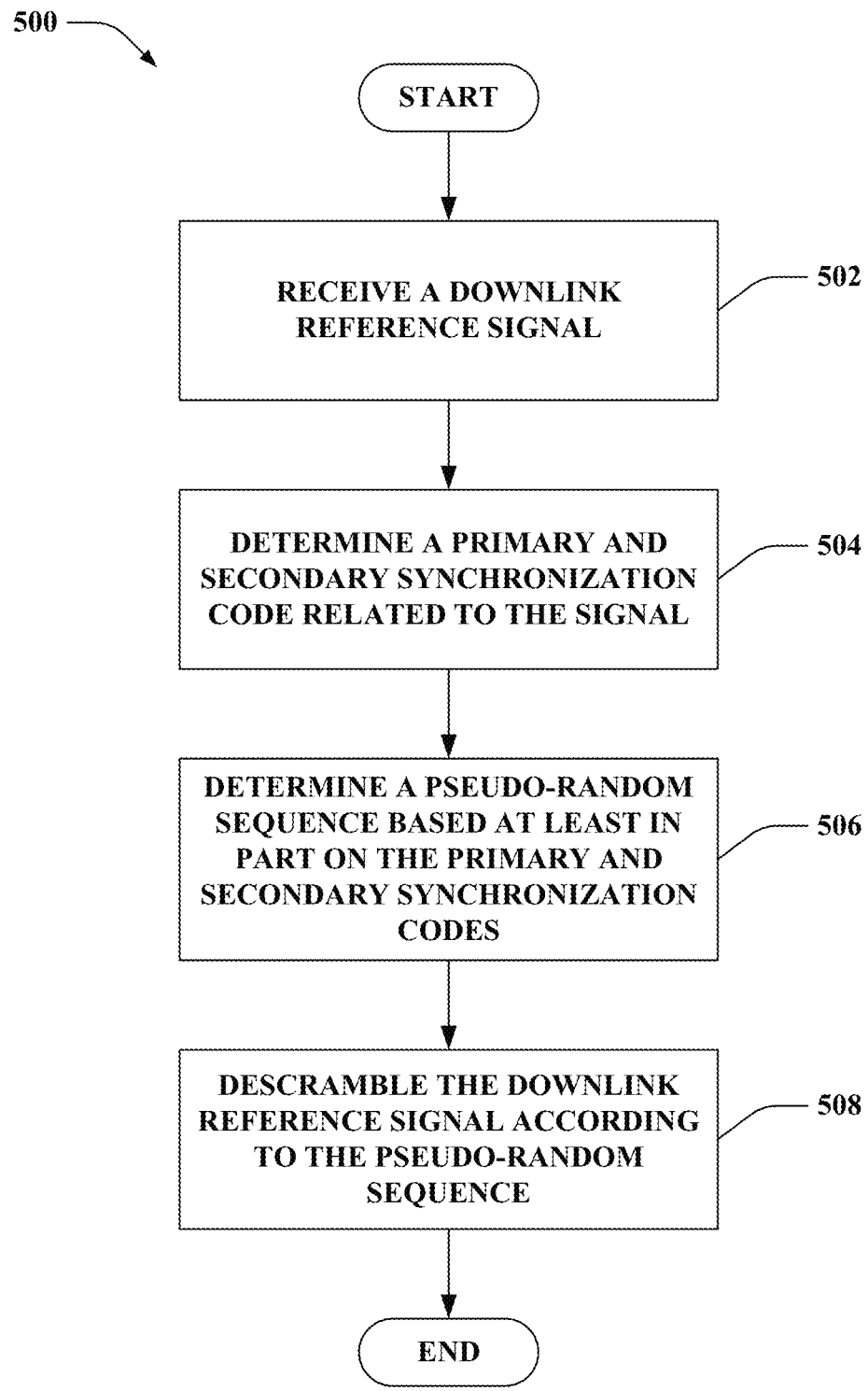
FIG. 5 is an illustration of an example methodology that facilitates interpreting scrambled downlink references signals.
Figure 6:
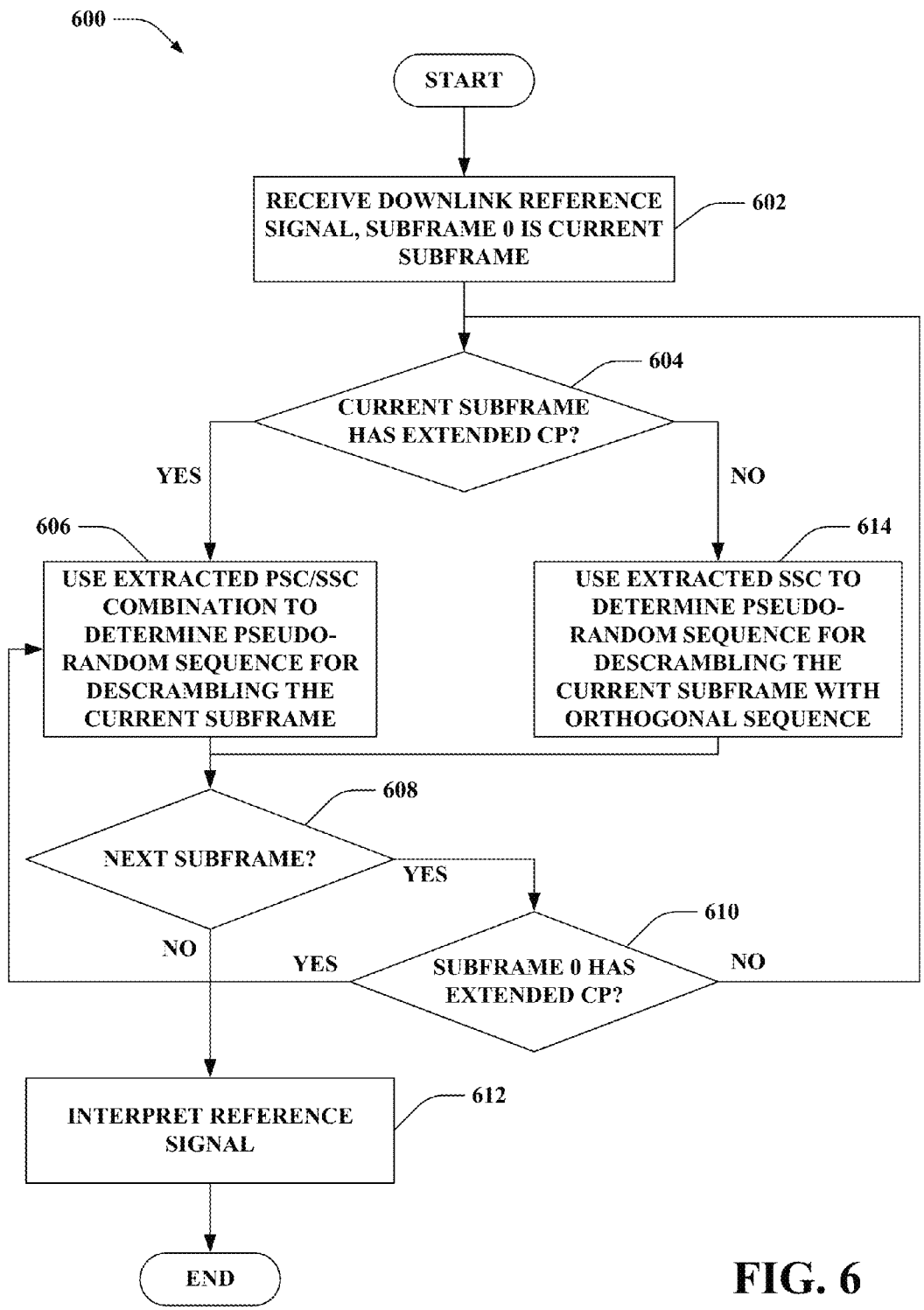
FIG. 6 is an illustration of an example methodology that facilitates interpreting reference signals based on cyclic prefixes.

Referring to FIGS. 4-6, methodologies relating to scrambling downlink reference signals according to primary and secondary synchronization codes are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, a methodology 400 that facilitates generating and transmitting a scrambled downlink RS is shown. At 402, a downlink RS is generated comprising information related to a transmitter of the RS. For example, the information can include synchronization codes, data in a primary broadcast channel, and/or the like. At 404, a unique PRS can be determined that corresponds to a primary and secondary synchronization code used by the transmitter of the RS. The code combination can map directly to a PRS; thus, other transmitters in proximity can also transmit RSs using disparate PRSs that help differentiate between the RSs. In this regard as well, the PRS can allow a receiver of the RS to identify the transmitter.

At 406, the downlink reference signal is scrambled using the PRS. In one example, this can be performed via an XOR operation between the RS and the PRS. At 408, the scrambled downlink RS is transmitted. Thus, RS scrambling can be performed without using an orthogonal sequence while maintaining a number of possible scramblings where the number of available PSCs matches the previously available orthogonal sequences. This can be beneficial in subframes having extended CP as described where benefits of orthogonal sequencing can be lost due to an expected high frequency selectivity of the channel.

Turning to FIG. 5, a methodology 500 that facilitates descrambling reference signals based at least in part on synchronization codes is displayed. At 502, a downlink RS is received; this can be from a transmitter with which communication is desired in one example. At 504, primary and secondary synchronization codes are determined as related to the RS. The codes can be extracted from specific time/frequency locations in specific subframes, such as subframes 0 and 5 for example. At 506, a PRS is determined based at least in part on the primary and secondary synchronized codes; this can also be based in part from the CP duration as described previously. For example, the codes can correlate to a PRS used to scramble the RS before transmission, and at 508, the PRS can be used to descramble the RS. In one example, the secondary synchronization code can directly relate to the PRS while the primary synchronization code is a reuse factor for the PRS or vice versa.

Turning to FIG. 6, illustrated is a methodology 600 that facilitates descrambling a downlink RS based at least in part on a size of a cyclic prefix associated with one or more frames or subframes of the RS. At 602, a downlink RS is received comprising one or more subframes. The method begins with subframe 0 as the current subframe. At 604, the CP length of the current subframe is evaluated. If the CP is extended (e.g., having a length greater than a specified threshold), a previously extracted PSC/SSC combination can be utilized to determine a PRS for descrambling the RS. It is to be appreciated that the PSC/SSC combination can be extracted using substantially any of the methods described herein at 606. At 608, it can be determined if there is a subsequent subframe in the RS. If so, it can be assumed that the remaining subframes are also of extended prefix, and thus, at 610, since subframe 0 is of extended CP, the next subframe can become the current subframe and similarly evaluated at step 606 until there are no more subsequent subframes. When no more subframes are present, the method continues to 612 where the RS is interpreted.

If it is determined at 604 that subframe 0 is not of extended CP, then at 614, a previously extracted SSC can be utilized to determine a directly correlated PRS to descramble the subframe with an orthogonal sequence as well. In this regard, for non-extended or normal CP, the orthogonal sequence was utilized by the scrambler in the transmitter. However, it cannot be assumed, in this case, that remaining subframes are of non-extended CP; thus, if subsequent subframes remain at 608, since subframe 0 does not have extended CP at 610, the method moves back to 604 to evaluate the CP of the next subframe. However, if no subframes remain, at 612 the RS is interpreted. Therefore, the method can allow utilization of orthogonal sequences in normal CP subframes to retain benefits thereof while removing the orthogonal sequencing from extended CP subframes as described herein where the benefits of orthogonal sequencing can be thwarted by the expected frequency selectivity of the channel.

It will be appreciated that, in accordance with one or more aspects described herein, inferences can be made regarding determining PSC and/or SSC for given transmitters as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a PSC/SSC combination, a PRS related thereto, an identity of the transmitter based on the PSC/SSC combination, an orthogonal sequence utilized in normal CP subframes, a cyclic prefix length for one or more subframes, etc.

Figure 7:
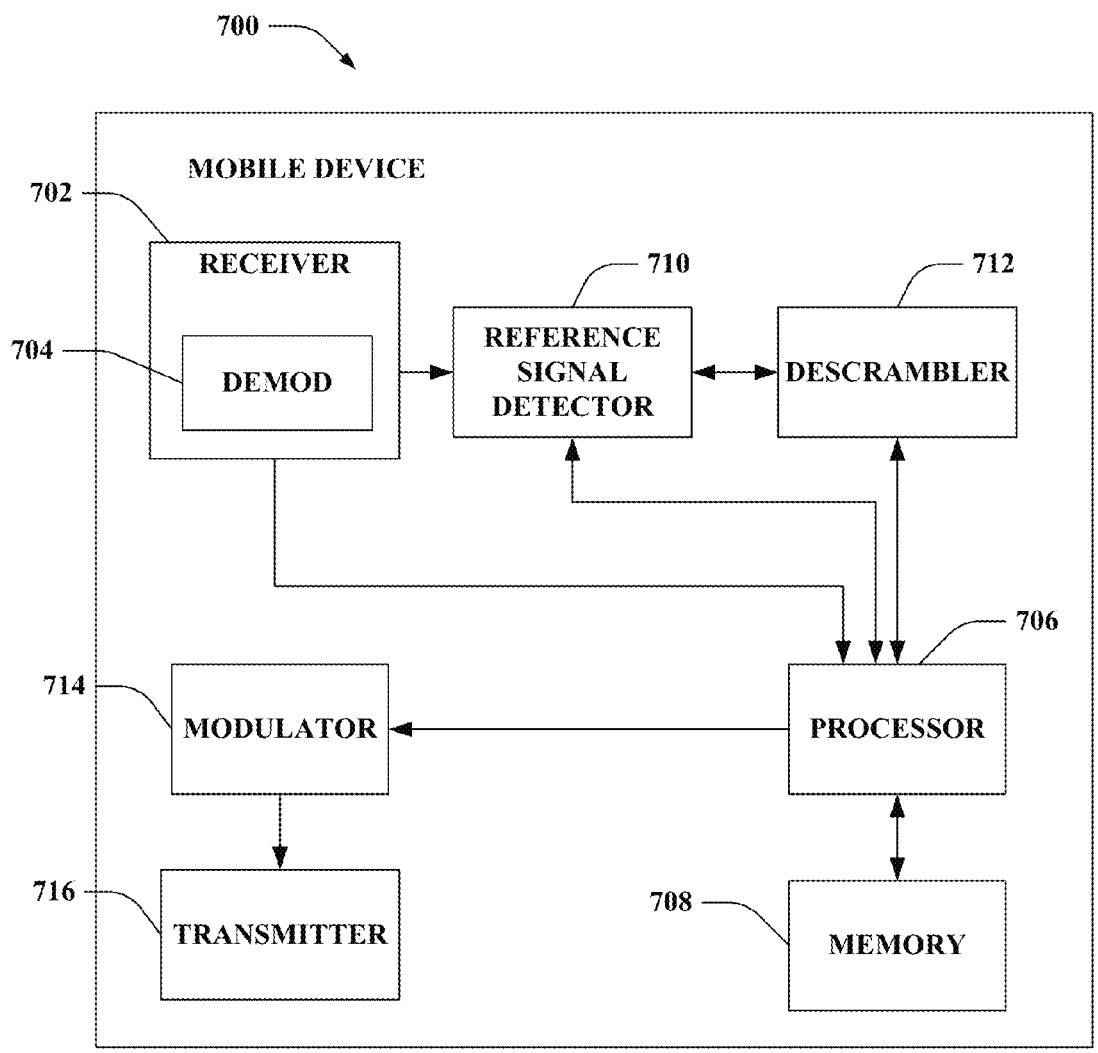
FIG. 7 is an illustration of an example mobile device that facilitates interpreting scrambled reference signals.

FIG. 7 is an illustration of a mobile device 700 that facilitates descrambling received downlink RSs. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 and/or receiver 702 can further be operatively coupled to a reference signal detector 710 that determines if a received signal is a downlink RS. Furthermore, the reference signal detector 710 can determine a PRS utilized by a transmitter to scramble the RS before transmitting. In one example, this can be based at least in part on an extracted PSC/SSC combination provided in the RS that correlates to a given PRS. Furthermore, this combination can be utilized to identify the transmitter of the RS. In another example, where the cyclic prefix is normal for instance, the reference signal detector 710 can determine an orthogonal sequence utilized to scramble the RS as well. Using the information, the descrambler 712 can descramble the RS.

According to an example, the reference signal detector 710 can determine a cyclic prefix length of one or more subframes of the RS and determine whether to descramble by utilizing a PRS related to the PSC/SSC combination or a PRS related to the SSC along with an orthogonal sequence. As described, the former can be utilized in extended CP subframes as orthogonality would likely be lost given the frequency selectivity due to the extended CP, whereas the latter can be utilized for subframes having normal CP. Alternatively, the PSC/SSC combination can map to the PRS in substantially all cases. Mobile device 700 still further comprises a modulator 714 and transmitter 716 that respectively modulate and transmit signal to, for instance, a base station, another mobile device, etc. Although depicted as being separate from the processor 706, it is to be appreciated that the reference signal detector 710, descrambler 712, demodulator 704, and/or modulator 714 can be part of the processor 706 or multiple processors (not shown).

Figure 8:
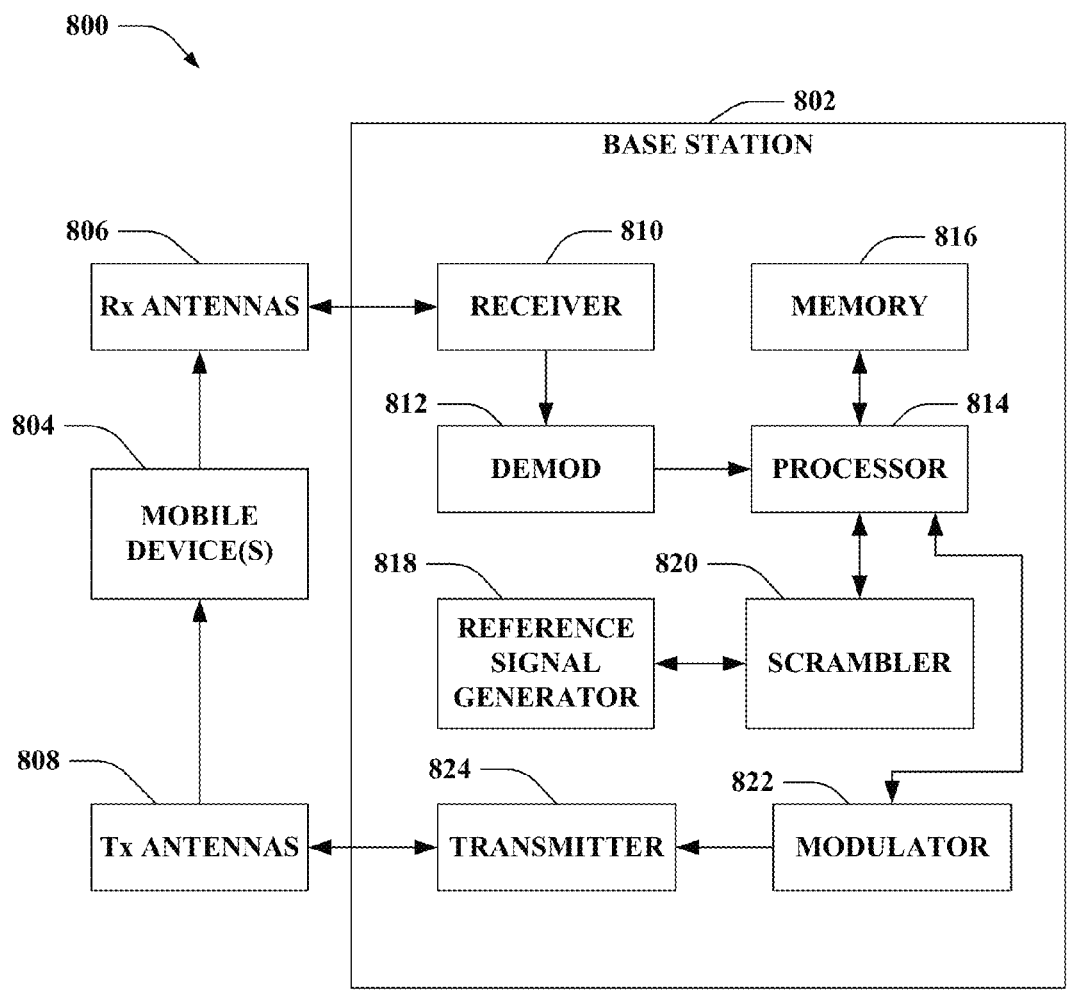
FIG. 8 is an illustration of an example system that facilitates communicating downlink reference signals.

FIG. 8 is an illustration of a system 800 that facilitates generating and scrambling downlink RSs for transmission thereof. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a reference signal generator 818 that creates an RS that can be utilized to determine synchronization, identity, and/or other information regarding the base station 802 and a scrambler 820 that can scramble the RS.

According to an example, the reference signal generator 818 can create an RS comprising primary and secondary synchronization codes. The codes can uniquely identify the base station 802 and can also directly correspond to one of a number of PRSs. The scrambler 820 can scramble the RS using the PRS (e.g. via an XOR operation). In subframes having a normal CP the PRS can relate to the SSC, and an orthogonal sequence can additionally be utilized to scramble the RS, in one example. The scrambled RS can be transmitted to one or more mobile devices 804 from the transmitter 824. Furthermore, although depicted as being separate from the processor 814, it is to be appreciated that the reference signal generator 818, scrambler 820, demodulator 812, and/or modulator 822 can be part of the processor 814 or multiple processors (not shown).

Figure 9:
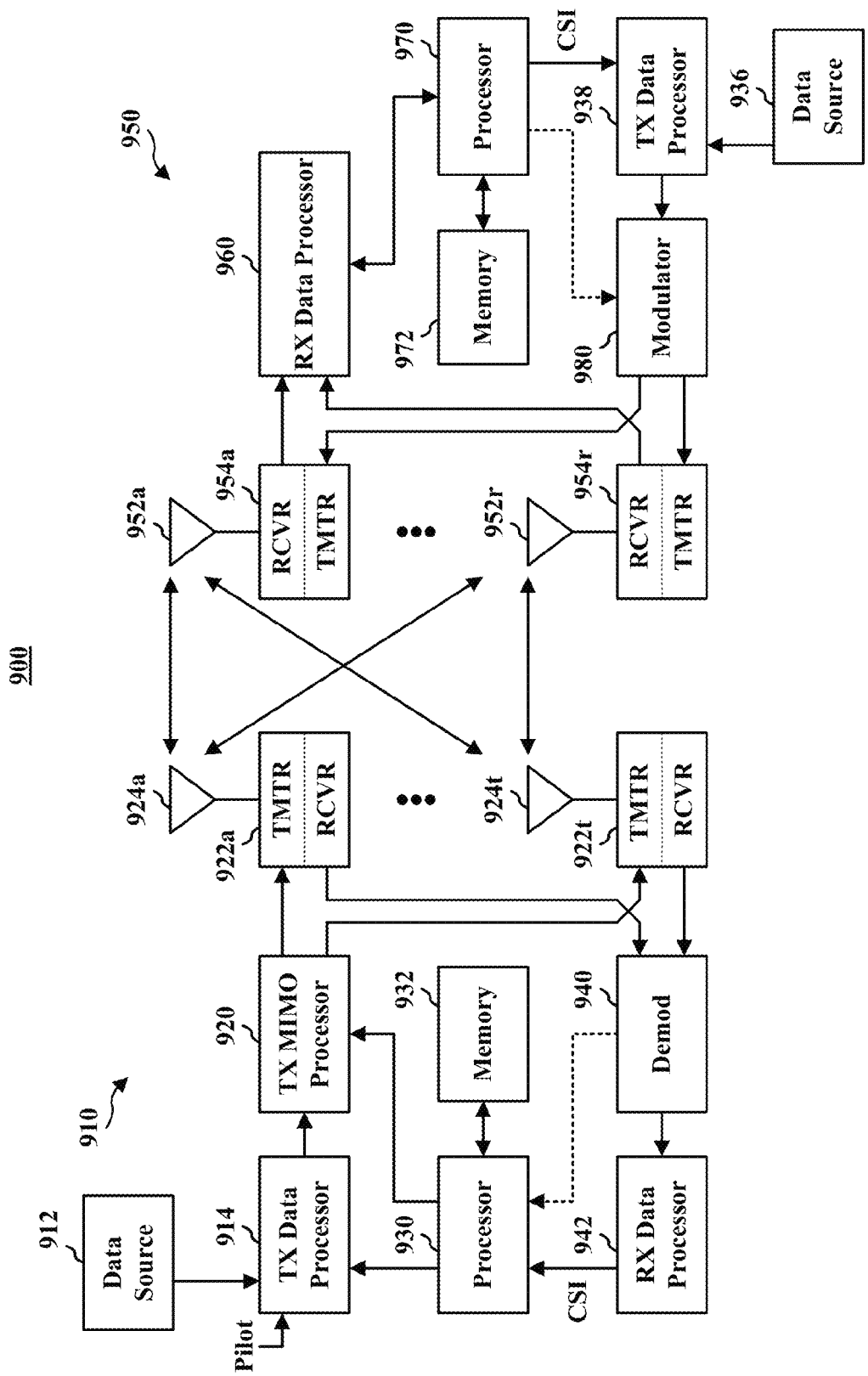
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
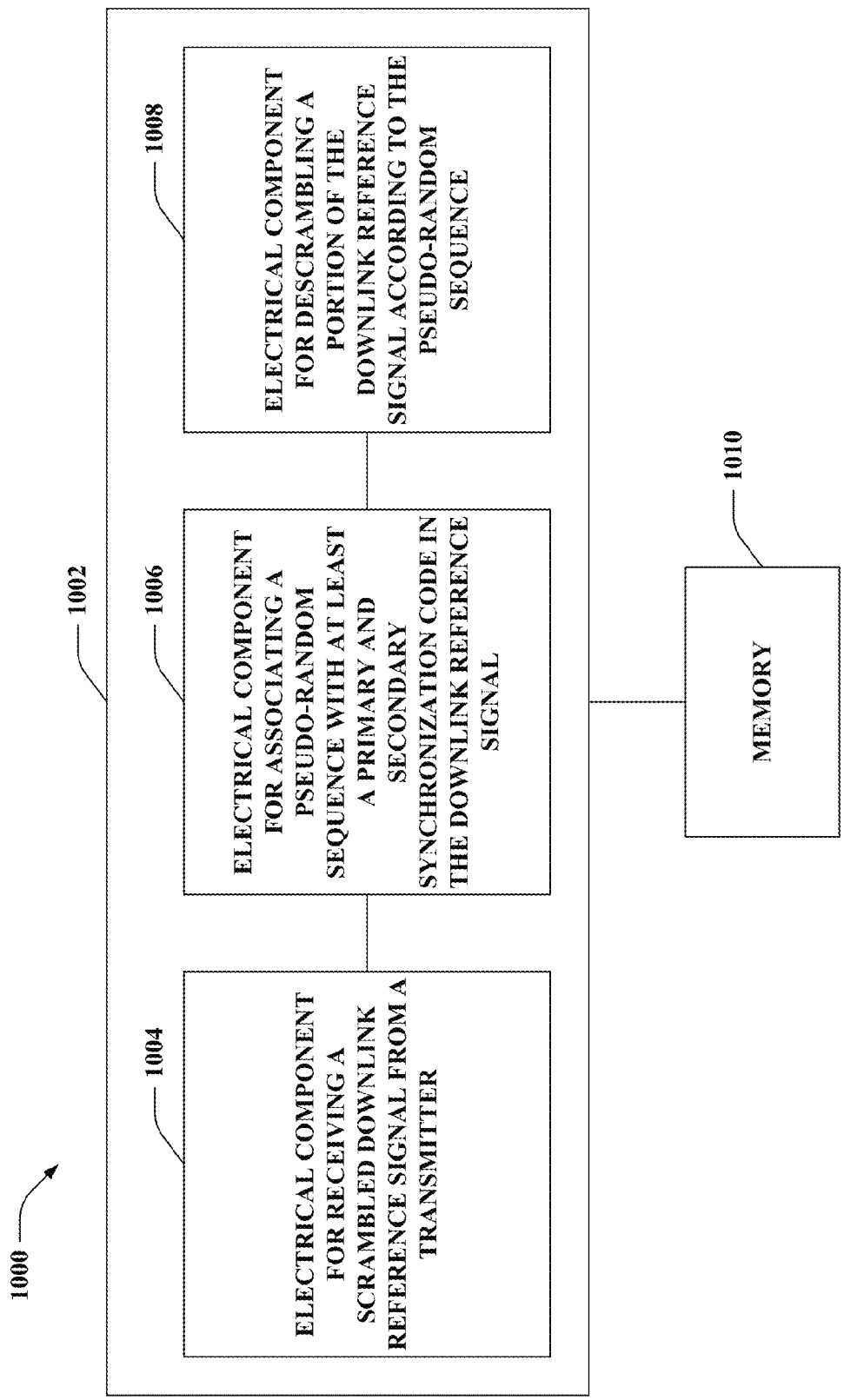
FIG. 10 is an illustration of an example system that descrambles scrambled reference signals.

With reference to FIG. 10, illustrated is a system 1000 that descrambles received downlink RSs according to a PRS. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a scrambled downlink RS 1004. For example, the RS can be received from a transmitter and can comprise synchronization and/or identifying information about the transmitter, such as unique synchronization codes, which can be chosen from an available set of codes. Further, logical grouping 1002 can comprise an electrical component for associating a PRS with at least a primary and secondary synchronization code in the downlink RS 1006. For example, the unique synchronization codes can correspond to a PRS; the unique property can help to identify the transmitter of the RS. Moreover, logical grouping 1002 can comprise and electrical component for descrambling a portion of the downlink RS according to the PRS 1008. The RS can subsequently be interpreted to extract other information as desired. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
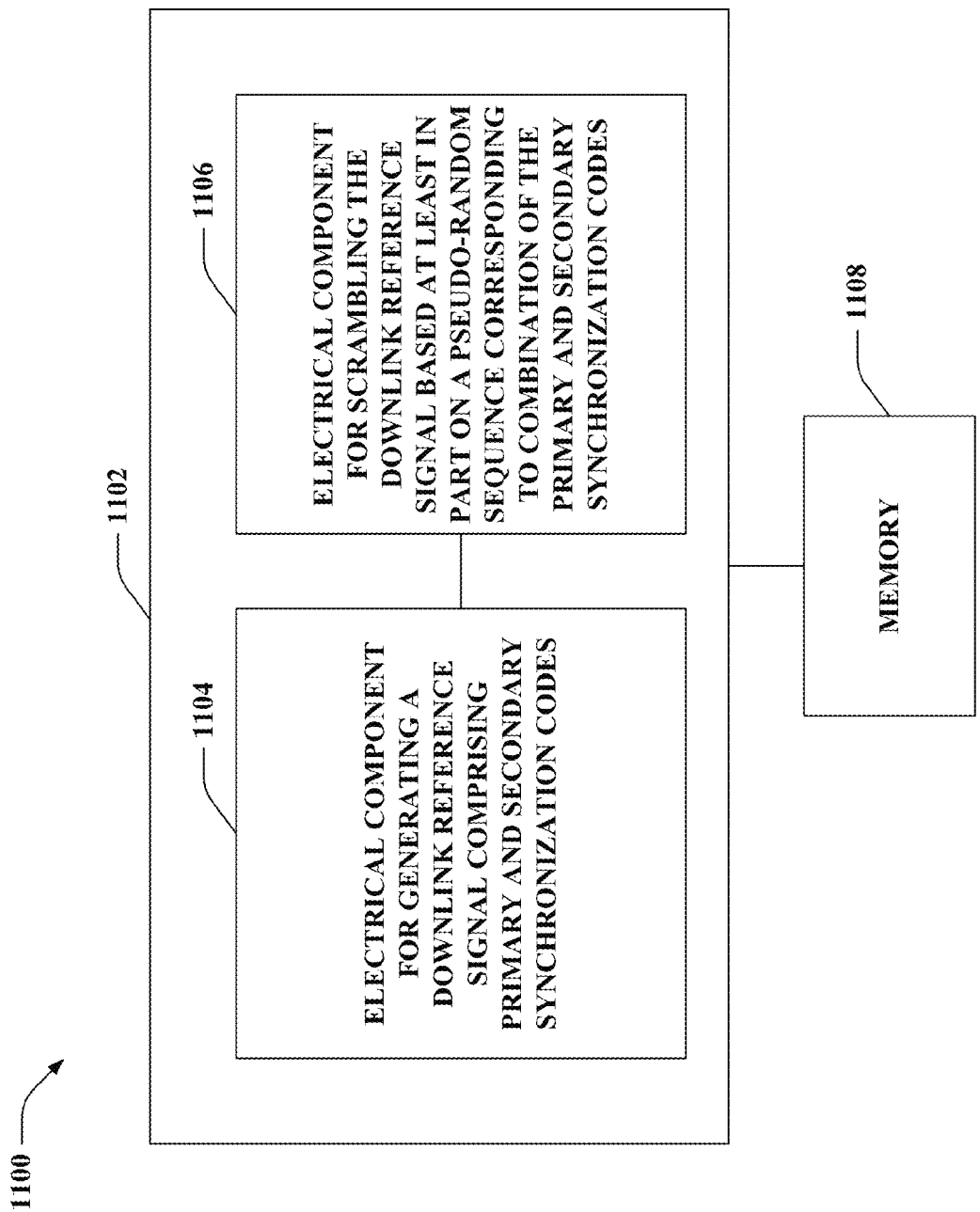
FIG. 11 is an illustration of an example system that scrambles downlink reference signals.

Turning to FIG. 11, illustrated is a system 1100 that creates and scrambles an RS for transmission across a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate generating and scrambling the RS. Logical grouping 1102 can include an electrical component for generating a downlink RS comprising primary and secondary synchronization codes 1104. Such information not only allows a receiver to identify the transmitter of the information, but also to acquire information regarding synchronizing with the transmitter for subsequent communications. Additionally, such information can lend to which PRS is used to scramble the RS before transmitting. Moreover, logical grouping 1102 can include an electrical component for scrambling the downlink RS based at least in part on a PRS corresponding to combination of the primary and secondary synchronization codes 1106. Thus, there can be a set of PRSs useable by a transmitter directly mapped to the combination of synchronization codes. In this regard, depending on the number of PRS/synchronization code mappings, the chances of a similar PRS utilized by a disparate transmitter that can cause interference are mitigated as the number of mappings increases. Once scrambled, the RS can be transmitted or broadcast to various receiving devices. Additionally, system 1100 can include a memory 1108 that retains instructions for executing functions associated with electrical components 1104 and 1106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
   receiving a scrambled downlink reference signal;
   determining a pseudo-random sequence based on received primary and secondary synchronization codes that directly map to the pseudo-random sequence; and
   descrambling a portion of subframes of the scrambled downlink reference signal according to the pseudo-random sequence and a determined cyclic prefix length for one or more of the portion of subframes.

2. The method of claim 1, wherein the primary and secondary synchronization codes are received in a disparate signal from a transmitter.

3. The method of claim 1, wherein the descrambling is performed over subframes with a cyclic prefix length above a specified threshold.

4. The method of claim 1, further comprising descrambling a portion of subframes of the downlink reference signal having a cyclic prefix length less than a specified threshold based at least in part on a pseudo-random sequence corresponding to the secondary synchronization code and an orthogonal sequence.

5. The method of claim 1, further comprising evaluating a first subframe to determine the cyclic prefix length for the first subframe and possible cyclic prefix lengths for remaining subframes.

6. The method of claim 5, wherein a dynamic broadcast channel in a subframe provides the cyclic prefix lengths of the remaining subframes.

7. The method of claim 1, further comprising identifying a transmitter based at least in part on the primary and secondary synchronization codes.

8. The method of claim 1, further comprising extracting the primary and secondary synchronization codes from the downlink reference signal.

9. A wireless communications apparatus, comprising:
   at least one processor configured to:
      receive a scrambled downlink reference signal,
      determine a pseudo-random sequence based on received primary and secondary synchronization codes that directly map to the pseudo-random sequence, and
      descramble a portion of subframes of the scrambled downlink reference signal according to the pseudo-random sequence and a determined cyclic prefix length for one or more of the portion of subframes; and
   a memory coupled to the at least one processor.

10. The wireless communications apparatus of claim 9, wherein the cyclic prefix length of the one or more subframes exceeds a specified threshold and the descrambling is performed utilizing a pseudo-random sequence determined from a primary and secondary synchronization code combination in the scrambled downlink reference signal.

11. The wireless communications apparatus of claim 10, wherein the primary and secondary synchronization code combination identifies a transmitter of the scrambled downlink reference signal.

12. The wireless communications apparatus of claim 9, wherein the cyclic prefix length of the one or more subframes is below a specified threshold and the descrambling is performed utilizing a pseudo-random sequence determined from a secondary synchronization code in the reference signal and a determined orthogonal sequence.

13. The wireless communications apparatus of claim 9, wherein the one or more subframes is a first subframe of the reference signal.

14. The wireless communications apparatus of claim 13, wherein the cyclic prefix of the first subframe is of normal length and the at least one processor is further configured to determine cyclic prefix lengths for the remaining subframes by evaluating a dynamic broadcast channel in the downlink reference signal.

15. The wireless communications apparatus of claim 13, wherein the cyclic prefix of the first subframe is of an extended length and the at least one processor is further configured to determine the remaining subframes having extended cyclic prefix lengths.

16. A non-transitory computer-readable medium, comprising:
code for causing at least one computer to receive a scrambled downlink reference signal;
code for causing the at least one computer to determine a pseudo-random sequence based on received primary and secondary synchronization codes that directly map to the pseudo-random sequence; and
code for causing the at least one computer to descramble a portion of subframes of the scrambled downlink reference signal according to the pseudo-random sequence and a determined cyclic prefix length for one or more of the portion of subframes.

17. The non-transitory computer-readable medium of claim 16, further comprising code for causing the at least one computer to determine a cyclic prefix length for one or more subframes of the portion of the scrambled downlink reference signal.

18. A method for wireless communications, comprising:
generating a downlink reference signal comprising primary and secondary synchronization codes;
scrambling the downlink reference signal based at least in part on a pseudo-random sequence that directly maps to combination of the primary and secondary synchronization codes; and
transmitting the scrambled downlink reference signal.

19. The method of claim 18, wherein the scrambling is performed in a portion of subframes of the downlink reference signal having a cyclic prefix length above a specified threshold.

20. The method of claim 19, further comprising:
scrambling a portion of subframes of the reference signal having a cyclic prefix length less than or equal to the threshold based at least in part on a pseudo-random sequence corresponding to the secondary synchronization code; and
applying an orthogonal sequence to the scrambled subframes of the reference signal having a cyclic prefix length less than or equal to the threshold.

21. The method of claim 18, wherein the pseudo-random sequence corresponds to the secondary synchronization code and the primary synchronization code is a reuse factor for the pseudo-random sequence.

22. The method of claim 18, wherein the primary and secondary synchronization code combination identifies a transmitter of the reference signal.

23. A wireless communications apparatus, comprising:
at least one processor configured to:
generate a downlink reference signal comprising primary and secondary synchronization codes,
scramble the downlink reference signal based at least in part on a pseudo-random sequence that directly maps to combination of the primary and secondary synchronization codes, and
transmit the scrambled downlink reference signal; and
a memory coupled to the at least one processor.

24. The wireless communications apparatus of claim 23, wherein the at least one processor scrambles a portion of subframes of the downlink reference signal having a cyclic prefix length above a specified threshold.

25. The wireless communications apparatus of claim 24, wherein the at least one processor is further configured to:
scramble a disparate portion of subframes of the reference signal having a cyclic prefix length less than the threshold based at least in part on a disparate pseudo-random sequence corresponding to the secondary synchronization code; and
applying an orthogonal sequence to the disparate portion of subframes.

26. The wireless communications apparatus of claim 23, wherein the pseudo-random sequence corresponds to the secondary synchronization code and the primary synchronization code is a reuse factor for the pseudo-random sequence.

27. The wireless communications apparatus of claim 23, wherein the primary and secondary synchronization code combination identifies the wireless communications apparatus.

28. A non-transitory computer-readable medium, comprising:
code for causing at least one computer to generate a downlink reference signal comprising primary and secondary synchronization codes;
code for causing the at least one computer to scramble the downlink reference signal based at least in part on a pseudo-random sequence that directly maps to combination of the primary and secondary synchronization codes; and
code for causing the at least one computer to transmit the scrambled downlink reference signal.

29. The non-transitory computer-readable medium of claim 28, wherein the scrambling is performed in a portion of subframes of the downlink reference signal having a cyclic prefix length above a specified threshold.

* * * * *